United States Patent Office 2,816,343
Patented Dec. 17, 1957

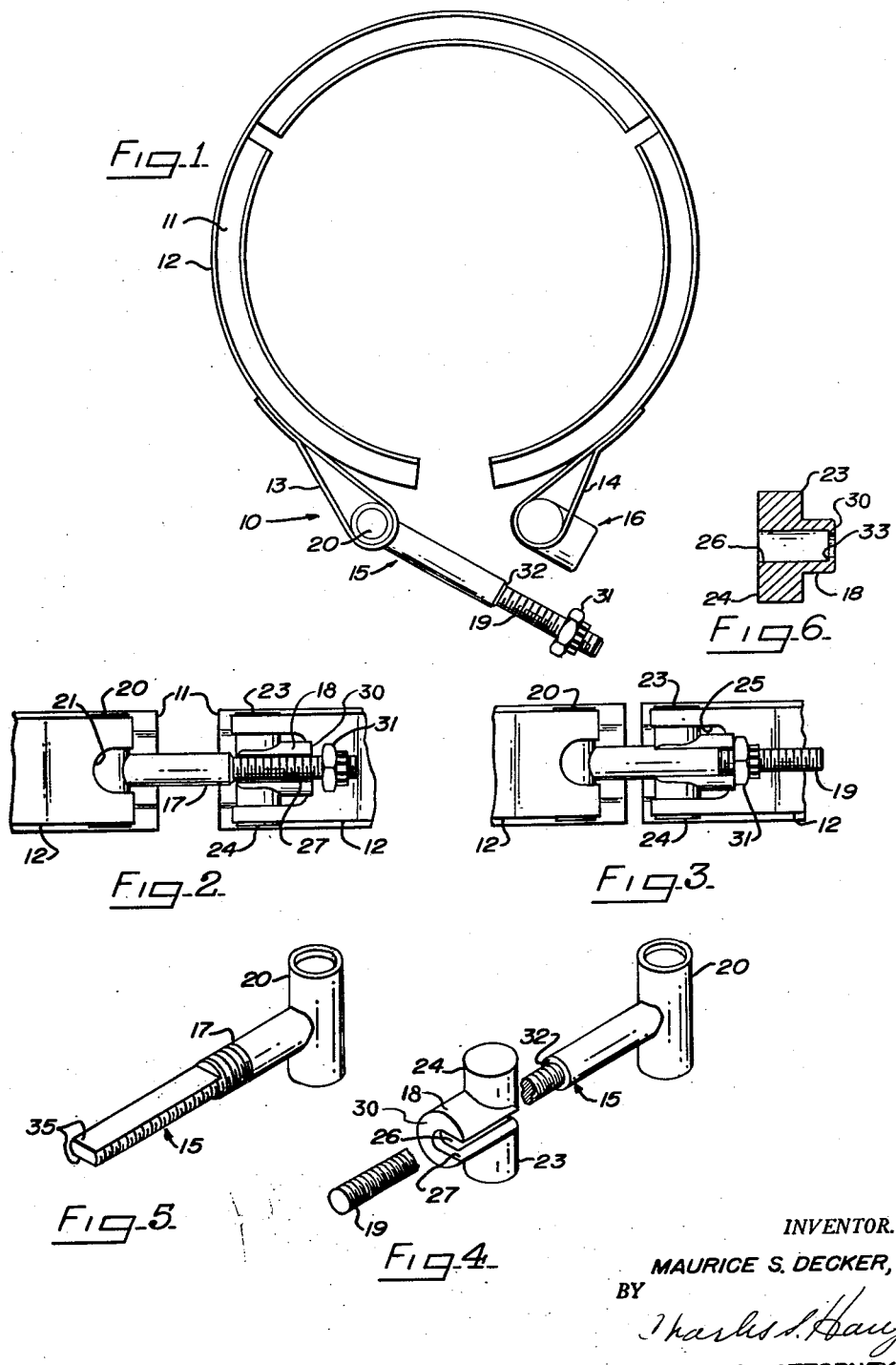

2,816,343

TAKE-UP AND LATCHING DEVICE

Maurice S. Decker, Jr., Columbus, Ohio, assignor to Surface Combustion Corporation, Toledo, Ohio, a corporation of Ohio Application June 4, 1956, Serial No. 589,192

9 Claims. (Cl. 24—279)

This invention relates generally to a fastening device and more particularly to a device for detachably securing the ends of a constricting band used to establish a sealing connection between the ends of aligned conduits.

This invention is directed to an improved constrictor band fastener, the principal advantages of which are simplicity, positive latching engagement, and rapid yet easy assembly and disassembly. This last advantage is of particular importance when such devices are employed in aircraft assemblies where the space is limited and frequent servicing of equipment is necessary. In the event of failure of any equipment with which such devices are employed, it is desirable to replace the defective components with the minimum effort and in the minimum time.

The principal object of this invention is to provide a novel and improved device for positively taking up the ends of a constrictor band and detachably latching them together with the greatest of ease.

Toward the attainment of the foregoing object, the invention contemplates a take-up and latching mechanism embodying a T-bolt having a threaded portion stepped-down from the shank which in latched engagement extends through the slotted cradle or shank portion of a T-trunnion member, a lock nut threaded on the threaded end of the bolt, and the T-head of the bolt and the trunnion elements of the T-trunnion member journaled in the respective bifurcated looped ends of a constrictor band. The dimensions of the T-bolt shank, threaded end, and slot of the T-trunnion member are so interrelated that the threaded end may pass into the slot longitudinally of the axis of the slot while the shank may only enter axially therein.

For a further consideration of what I believe to be novel and my invention, attention is directed to the following specification and drawing and the concluding claims thereof.

Referring now to the drawings in which like characters are used to designate the same or similar parts throughout the several figures of the drawing:

Fig. 1 is a plan view of an actuator ring of a tube coupling with which the take-up and latching mechanism is operatively engaged;

Fig. 2 is a front view of the latching mechanism in an open position;

Fig. 3 is a front view of the mechanism in a closed position;

Fig. 4 is a perspective view of the T-bolt and T-trunnion member of the take-up and latching mechanism;

Fig. 5 is a perspective view of a modified form of T-bolt; and

Fig. 6 is a cross-sectional view of the T-trunnion member.

In Fig. 1 the take-up and latch mechanism is designated generally by the numeral 10 and for the purpose of illustration is shown in operative engagement with an actuator ring 11 of an aircraft type conduit coupling. A flexible metallic constrictor band 12 is adapted to substantially circumpose a tubular member or conduit, in this instance the actuator ring 11. The ends of the metallic strip constituting the constrictor band are bent to form loops or journal members 13 and 14 to respectively receive a T-bolt 15 in one and a T-trunnion member 16 in the other. It is to be understood that the loop or journal members 13 and 14 of the constrictor band 12 need not be integral parts of said band but may be separately formed members secured to the band. However, for manufacturing economy it is preferable that the journal members be integral parts of the band.

The constrictor band journals 13 and 14 are bifurcated to permit T-bolt shank 17 and T-trunnion cradle 18 to extend from their respective journals and to allow pivotable movement therein. The T-bolt 15, with shank 17 and a threaded end 19 of reduced diameter, has T-head 20 journaled in bifurcated loop 13 and the shank 17 extending through the slot 21 of the loop while the T-trunnion member 16 has trunnion elements 23 and 24 journaled in the respective portions of the bifurcated loop 14, and shank portion 18 bored to receive the shank 17 extending through the slot 25 of said loop 14. The bore 26 is provided with a slot or passage 27 to permit easy insertion of the threaded portion of the T-bolt 15 longitudinally into the cradle 18 but is of such dimension as to prevent longitudinal withdrawal of the shank 17 and thus limit the withdrawal of the shank axially from said bore 26. The end face of shank portion 18 is adapted to provide a shoulder 30 upon which a nut bears as it is threaded upon the T-bolt 15 and slidably draws the shank 17 through bore 26.

When it is desired to limit the extent to which the shank 17 may be slidably drawn through the bore 26 of cradle 18 and thereby prevent overtightening and distortion of the constrictor band 12, said bore 26 is provided with an internal shoulder 33 to abutably engage shoulder 32 of T-bolt shank 17.

In operation the two ends of the flexible band 12 are manually drawn together and T-bolt 15 is pivoted from the position as indicated in Fig. 1 into operative engagement as shown in Fig. 2 with threaded portion 19 of T-bolt 15 disposed through passage 25 into bore 26 of the trunnion member. As the lock nut 31 is threaded the shank 17 is slidably drawn to and through the bore 26 of the trunnion member 16 and the two ends are concurrently drawn together to tightly clamp the band 12 about the actuator ring 11 or tubular conduit.

To release the latching mechanism 10, the nut 31 is rotated in a direction and amount so that the distance between the nut 31 and shoulder 32 of the shank 17 is slightly greater than the length of the shank portion 18. The T-bolt shank 17 may then be easily pivoted into an open position and the flexibility of the band 12 permits easy removal of the band from the conduit.

In the modified form of the T-bolt disclosed in Fig. 5, the T-bolt shank 17 has flat surfaces 35 perpendicular to the axis of the T-bolt head 20 to reduce the width of the shank sufficiently to permit easy insertion of such reduced shank portion into passage 27 of shank portion 18 yet bar longitudinal withdrawal of the shank length without the "flats." It is obvious that with such modified T-bolt, the shoulder 33 of a shank portion 18 would not be employed.

The advantages of the invention in simplicity, positiveness of latching and rapid assembly and disassembly will be apparent to those skilled in the art from the foregoing description of the preferred embodiments of the invention. It will also be apparent to those skilled in the art that many modifications of structure may be made within the principles and scope of the invention, which are not to be regarded as limited by the detailed description of the preferred embodiment thereof.

I claim:

1. A fastening device for detachably securing a plurality of elements together comprising a bolt having a threaded shank portion, a part of the threaded portion being of reduced cross-section; a bolt receiving member having a bore therethrough to slidably receive said shank, an end face transverse of the axis of said bore forming a bearing seat and an open end slot extending radially from said bore, the width of said slot and the dimensions of the bolt shank with its reduced portion being so interrelated that the reduced shank portion may enter into the bore through the slot while the full shank portion may only enter the bore axially thereof; and a nut for adjustably engaging the bolt and slidably drawing the bolt shank through the bore of the receiving member as the nut is tightened against the bearing seat of said bolt receiving member.

2. A fastening device as defined in claim 1, wherein the reduced shank portion is formed by reducing the diameter of the threaded shank portion from that of the unthreaded shank portion.

3. A fastening device as defined in claim 1, wherein the reduced shank portion is formed by removing diametrically opposed cross-sectional segments from the bolt.

4. A fastening device as defined in claim 1, wherein the length of the bolt shank portion of reduced cross-section is greater than the length of the bolt receiving member to permit retention of the nut on the bolt shank during insertion of the bolt shank portion of reduced cross-section into the slot of the bolt receiving member.

5. A take-up and fastening device for detachably securing the bifurcated and looped ends of a circular strip of flexible material comprising a bolt pivotably disposed in one of the loops; a nut threadably mounted on said bolt; and a preformed member pivotably disposed in the other loop, said member being provided with a bore therethrough transverse to its pivotable axis, an open end slot extending radially from said bore and an end face forming a seat for said nut, said bolt having a shank partially threaded, said threaded portion being of reduced diameter from that of the unthreaded shank portion and adapted to pass freely through the slot of the pre-formed member, said unthreaded shank portion being of greater diameter than the slot of the preformed member but substantially that of the bore as to be slidable therein upon tightening of the nut, which tightening engages the nut with the end face of the pre-formed member and draws the ends of the circular strip together.

6. A take-up and fastening device for detachably securing the bifurcated and looped ends of a circular strip of flexible material comprising a bolt pivotably disposed in one of the lops; a nut threadedly mounted on said bolt; and a pre-formed member pivotably disposed in the other loop, said member being provided with a bore therethrough transverse to its pivotable axis, an open end slot extending radially from said bore and an end face forming a seat for said nut, said bolt having a shank partially threaded, a part of said threaded portion being of reduced cross-section to pass freely through the slot of the pre-formed member, said unthreaded shank portion being of greater diameter than the slot of the pre-formed member but substantially that of the bore as to be slidable therein upon tightening up the nut, which tightening engages the nut with the end face of the pre-formed member and draws the ends of the circular strip together.

7. A fastening device as defined in claim 6, wherein the reduced shank portion is formed by removing diametrically opposed cross-sectional segments which have their chords perpendicular to the pivotable axis of the bolt.

8. A take-up and fastening device for detachably securing the slotted looped ends of a circular strip of material comprising a T-bolt pivotally disposed in one of the looped ends and the shank of said T-bolt extending through the slot of said loop, the shank of said T-bolt being partially threaded with the threaded portion being of less diameter than the unthreaded portion; a T-trunnion member pivotably disposed in the other of said looped ends, said T-trunnion member having a shank portion provided with a bore therethrough having its axis perpendicular to and substantially in the same plane of the trunnion axis, an open ended slot extending radially from said bore, the width of said slot being less than the diameter of said bore and of such dimension as to freely receive the reduced T-bolt shank portion but prohibit the withdrawal of the unreduced T-bolt shank portion therethrough, and a bearing surface at the end of said T-trunnion shank portion transverse to said bore; and a nut for threadably engaging said bolt and slidably drawing the bolt shank through the bore of the trunnion member as the nut is tightened against the bearing surface of said trunnion member.

9. A take-up and fastening device for detachably securing the bifurcated and looped ends of a circular strip of flexible material comprising a T-bolt journaled in one of the looped ends and extending through the bifurcated portion thereof, said T-bolt having a stepped-down shank to provide a shoulder with the stepped-down portion being threaded; a T-trunnion member journaled in the other of the looped ends and extending through the bifurcated portion thereof, said T-trunnion member being formed with a bore having a diameter substantially equal to that of the unthreaded T-bolt shank portion and with its axis transverse of and substantially in the same plane as the trunnion axis, a portion of said bore being of reduced diameter to provide a stop shoulder for abutting engagement with the T-bolt shoulder, an open-end slot extending radially upward from said bore, the width of said slot being slightly greater than the diameter of the T-bolt threaded shank portion but less than the diameter of the T-bolt unthreaded shank portion, and an end face transverse to the axis of the bore to provide a bearing surface; and a nut for threadably engaging said T-bolt and slidably drawing the T-bolt shank through the bore of the T-trunnion member as said nut is tightened against the bearing surface of said T-trunnion member thereby drawing the looped end of the circular strip together.

References Cited in the file of this patent
UNITED STATES PATENTS
991,769    Catelain _____ May 9, 1911